(12) United States Patent
Bhogal et al.

(10) Patent No.: US 12,094,104 B1
(45) Date of Patent: *Sep. 17, 2024

(54) METHOD AND SYSTEM FOR AUTOMATIC COOK PROGRAM DETERMINATION

(71) Applicant: June Life, LLC, San Francisco, CA (US)

(72) Inventors: Nikhil Bhogal, San Francisco, CA (US); Wiley Wang, San Francisco, CA (US); Jithendra Paruchuri, San Francisco, CA (US)

(73) Assignee: June Life, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,154

(22) Filed: Nov. 6, 2023

Related U.S. Application Data

(63) Continuation of application No. 17/500,241, filed on Oct. 13, 2021, now Pat. No. 11,844,458.

(60) Provisional application No. 63/091,020, filed on Oct. 13, 2020.

(51) Int. Cl.
*G06T 7/00* (2017.01)

(52) U.S. Cl.
CPC .... *G06T 7/001* (2013.01); *G06T 2207/20081* (2013.01); *G06T 2207/30128* (2013.01)

(58) Field of Classification Search
CPC ........... G06T 7/001; G06T 2207/20081; G06T 2207/30128
See application file for complete search history.

(56) References Cited

U.S. PATENT DOCUMENTS

| | | | |
|---|---|---|---|
| 6,370,513 B1 | 4/2002 | Kolawa et al. |
| 8,429,026 B1 | 4/2013 | Kolawa et al. |
| 8,849,805 B2 | 9/2014 | Osaki |
| 9,129,277 B2 | 9/2015 | Macintosh |
| 10,776,856 B2 | 9/2020 | Leifer et al. |
| 11,036,964 B2 | 6/2021 | Srivastava et al. |
| 2009/0037288 A1 | 2/2009 | Christensen |
| 2013/0006787 A1 | 1/2013 | Iizaka et al. |
| 2013/0224694 A1 | 8/2013 | Moore et al. |
| 2015/0056344 A1 | 2/2015 | Luckhardt |

(Continued)

FOREIGN PATENT DOCUMENTS

| | | |
|---|---|---|
| EP | 3518149 A1 | 7/2019 |
| EP | 3617991 A1 | 3/2020 |

(Continued)

OTHER PUBLICATIONS

Bhogal, Nikhil, et al., "Method and System for Automatic Cook Program Determination", U.S. Appl. No. 18/387,154, filed Nov. 6, 2023.

(Continued)

*Primary Examiner* — Casey L Kretzer
(74) *Attorney, Agent, or Firm* — Banner & Witcoff, Ltd.

(57) ABSTRACT

In variants, the method can include: sampling cavity measurements of the cook cavity; determining an image representation using the cavity measurements; determining a food class based on the image representation; optionally comparing the image representation to prior image representations; optionally determining a new food class based on the image representation; optionally updating a food identification module with the new food class; and optionally determining a cook program associated with the new food class.

20 Claims, 11 Drawing Sheets

(56) References Cited

U.S. PATENT DOCUMENTS

| | | |
|---|---|---|
| 2015/0066909 A1 | 3/2015 | Uchida et al. |
| 2015/0109451 A1 | 4/2015 | Dhankhar |
| 2015/0170543 A1 | 6/2015 | Shahar et al. |
| 2015/0290795 A1 | 10/2015 | Oleynik |
| 2016/0063692 A1 | 3/2016 | Divakaran et al. |
| 2016/0073886 A1 | 3/2016 | Connor |
| 2016/0081515 A1 | 3/2016 | Aboujassoum et al. |
| 2016/0232625 A1 | 8/2016 | Akutagawa et al. |
| 2017/0053551 A1 | 2/2017 | Prisk |
| 2017/0316488 A1 | 11/2017 | Kremen et al. |
| 2017/0372197 A1 | 12/2017 | Baughman et al. |
| 2018/0308143 A1 | 10/2018 | Chan et al. |
| 2019/0065823 A1 | 2/2019 | Srivastava et al. |
| 2019/0108396 A1 | 4/2019 | Dal Mutto et al. |
| 2019/0171707 A1 | 6/2019 | Rapaport |
| 2019/0197466 A1 | 6/2019 | Hand et al. |
| 2019/0215424 A1 | 7/2019 | Adato et al. |
| 2019/0236362 A1 | 8/2019 | Srivastava et al. |
| 2020/0019861 A1 | 1/2020 | Jeong |
| 2021/0272088 A1 | 9/2021 | Srivastava et al. |
| 2022/0007689 A1 | 1/2022 | Baldwin |

FOREIGN PATENT DOCUMENTS

| | | |
|---|---|---|
| KR | 20180060257 A | 6/2018 |
| WO | 2008091281 A2 | 7/2008 |
| WO | 2017075498 A1 | 5/2017 |
| WO | 2018198100 A1 | 11/2018 |
| WO | 2018198233 A1 | 11/2018 |
| WO | 2020100091 A1 | 5/2020 |

OTHER PUBLICATIONS

Instacart, PlateJoy partner to deliver recommended groceries to dieters. Lora Kolodny. May 3, 2016. (May 3, 2016). Published by TechCrunch. (Year: 2016).

"Examining the Use of Neural Networks for Feature Extraction: A Comparative Analysis using Deep Learning, Support Vector Machines, and K-Nearest Neighbor Classifiers", Notley, Stephen et al. , Department of Computer Science, Rensselaer Polytechnic Institute, Troy NY, Jun. 12, 2018.

"WiFIRE® Controller: Creating Custom Cook Cycles | Trager Grills", https://www.youtube.com/watch?v=jyx3fow_cpc, Mar. 29, 2017.

Charpiat, Guillaume , et al., "Input Similarity from the Neural Network Perspective" 33rd Conference on Neural Information Processing Systems, (NeurIPS 2019), Vancouver, Canada.

Congcong, Li , "Data Priming Network for Automatic Check-Out", Processing of the 28th ACM join meeting o EU software engineering conference and symposium on the foundation of software engineering, ACM, New York, NY, USA, Oct. 15, 2019, pp. 2152-2160, XP 058639280.

Khoury Rita, "Food Logging is Old School: 'Eat This Much' Plans Your Meals Ahead Based on Dietary Preferences and Fitness Goals".

Srivastava, Abhinai , et al., "Multi-Batch Self-Checkout System and Method of Use", U.S. Appl. No. 17/945,912, filed Sep. 15, 2022.

METHOD AND SYSTEM FOR AUTOMATIC COOK PROGRAM DETERMINATION

CROSS-REFERENCE TO RELATED APPLICATIONS

This application is a continuation of U.S. application Ser. No. 17/500,241 filed 13 Oct. 2021, which claims the benefit of U.S. Provisional Application No. 63/091,020 filed 13 Oct. 2020, each of which is incorporated in its entirety by this reference.

TECHNICAL FIELD

This invention relates generally to the appliance field, and more specifically to a new and useful method for automatic cook program determination in the appliance field.

BACKGROUND

Automated appliances, such as smart appliances, can rely on computer-vision based techniques to automatically recognize foodstuff to be cooked. However, users generally prefer to cook personalized meals, which cannot be recognized using a generic computer-vision model.

Thus, there is a need in the appliance control field to create a new and useful system and method for automatic cook program determination. This invention provides such new and useful system and method.

DETAILED DESCRIPTION

The following description of the preferred embodiments of the invention is not intended to limit the invention to these preferred embodiments, but rather to enable any person skilled in the art to make and use this invention.

1. Overview

Figure 1:
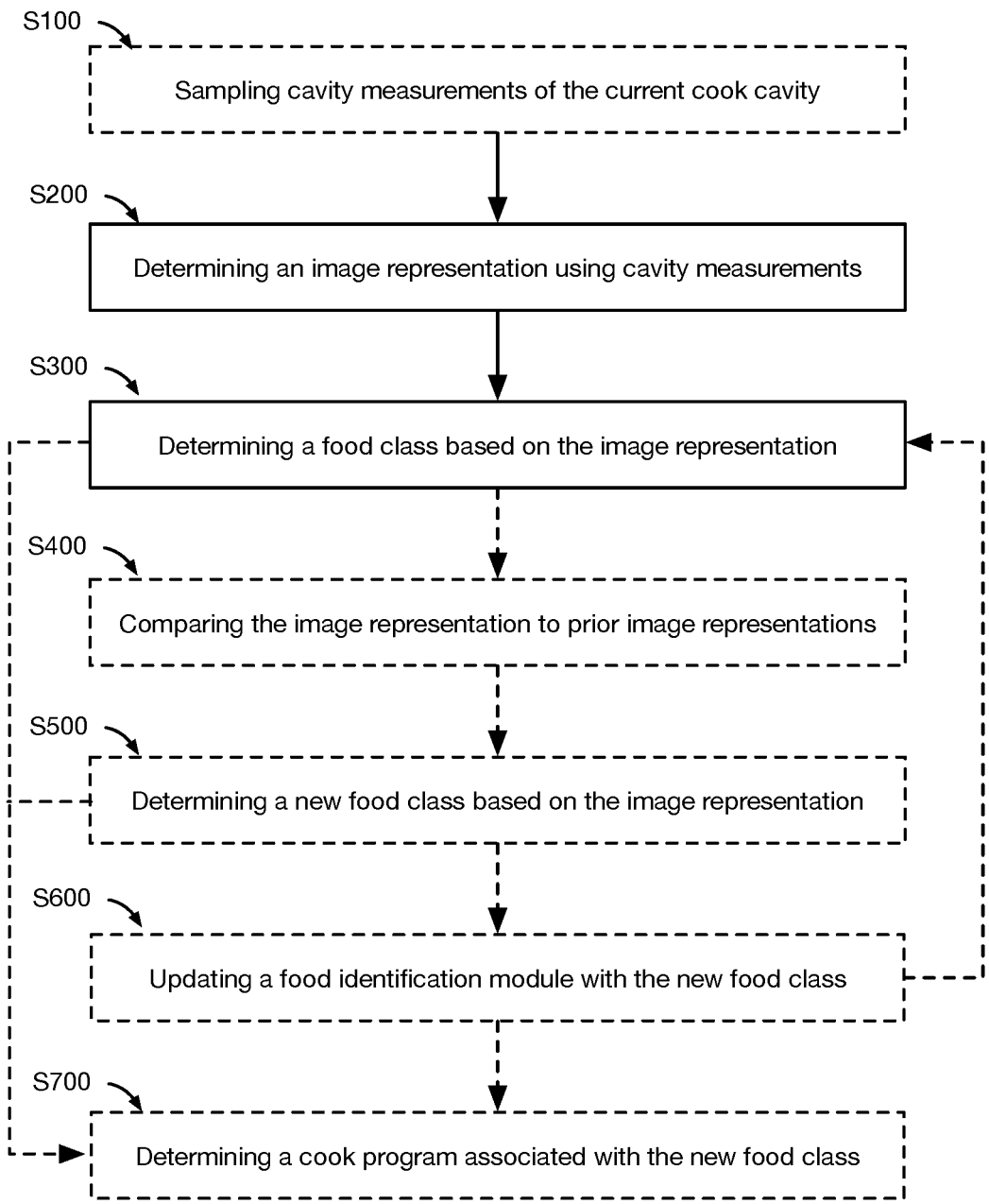
FIG. 1 is a schematic representation of the method.

The method, an example of which is shown in FIG. 1, can include: sampling cavity measurements of the current cook cavity S100; determining an image representation using the cavity measurements S200; determining a food class based on the image representation S300; optionally comparing the image representation to prior image representations S400; optionally determining a new food class based on the image representation S500; optionally updating a food identification module with the new food class S600; and optionally determining a cook program associated with the new food class S700. However, the method can include any other suitable elements.

Figure 2:
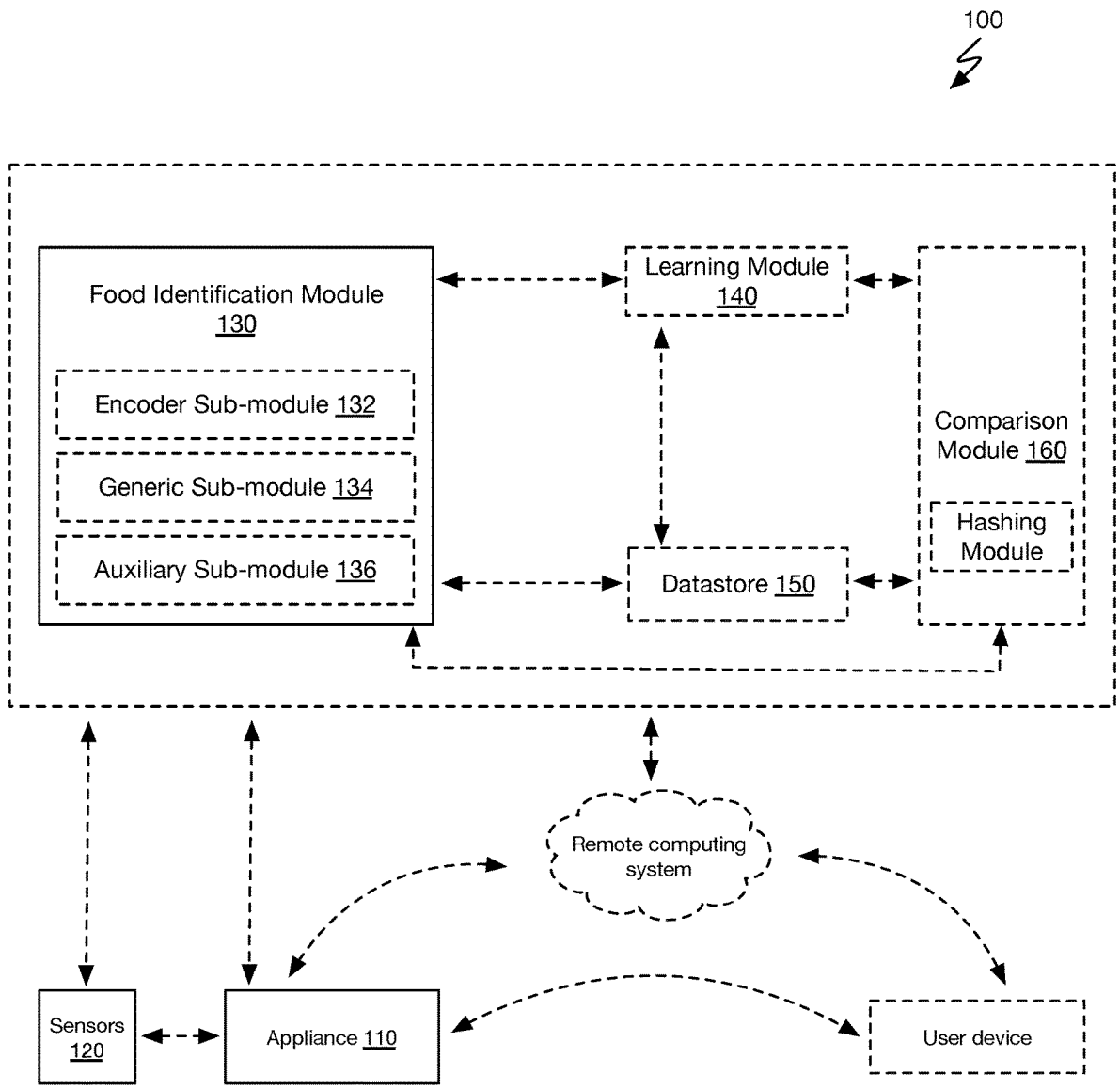
FIG. 2 is a schematic representation of the system.

As shown in FIG. 2, the system for automatic cook program determination can include or be used with one or more appliances (e.g., cooking appliances, such as ovens, grills, stovetops, sous vide cookers, fryers, etc.), and one or more sensors (e.g., temperature probe, camera, etc.). The system can also include: a food identification module, a remote computing system, a datastore, and/or any other components. However, the method can be performed using any other suitable system.

In variants, the system can include or be used with the cooking appliance as described in U.S. application Ser. No. 16/793,309, filed 18 Feb. 2020, which is incorporated in its entirety by this reference.

2. EXAMPLES

Figure 3:
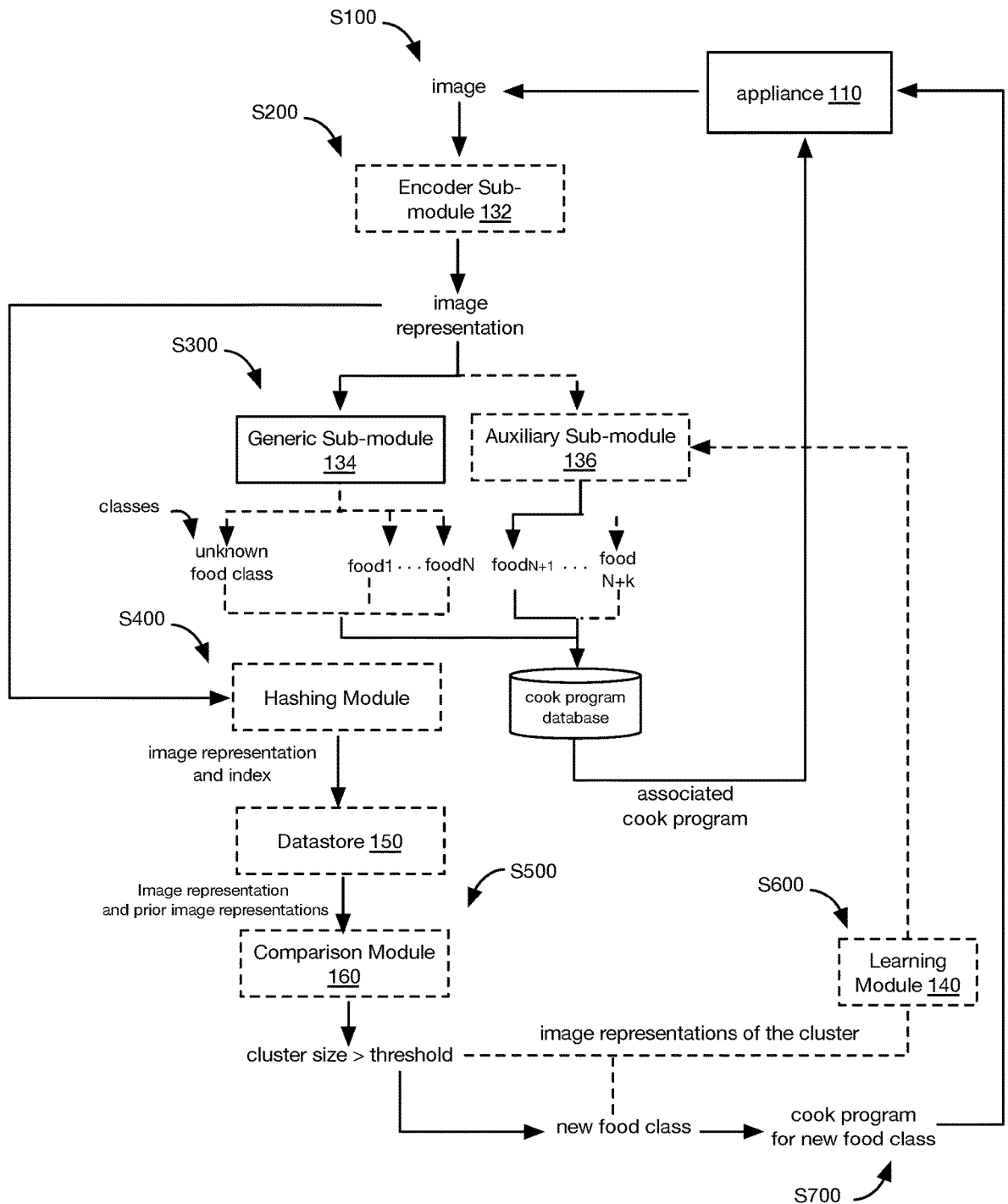
FIG. 3 is an embodiment of the method.
Figure 4:
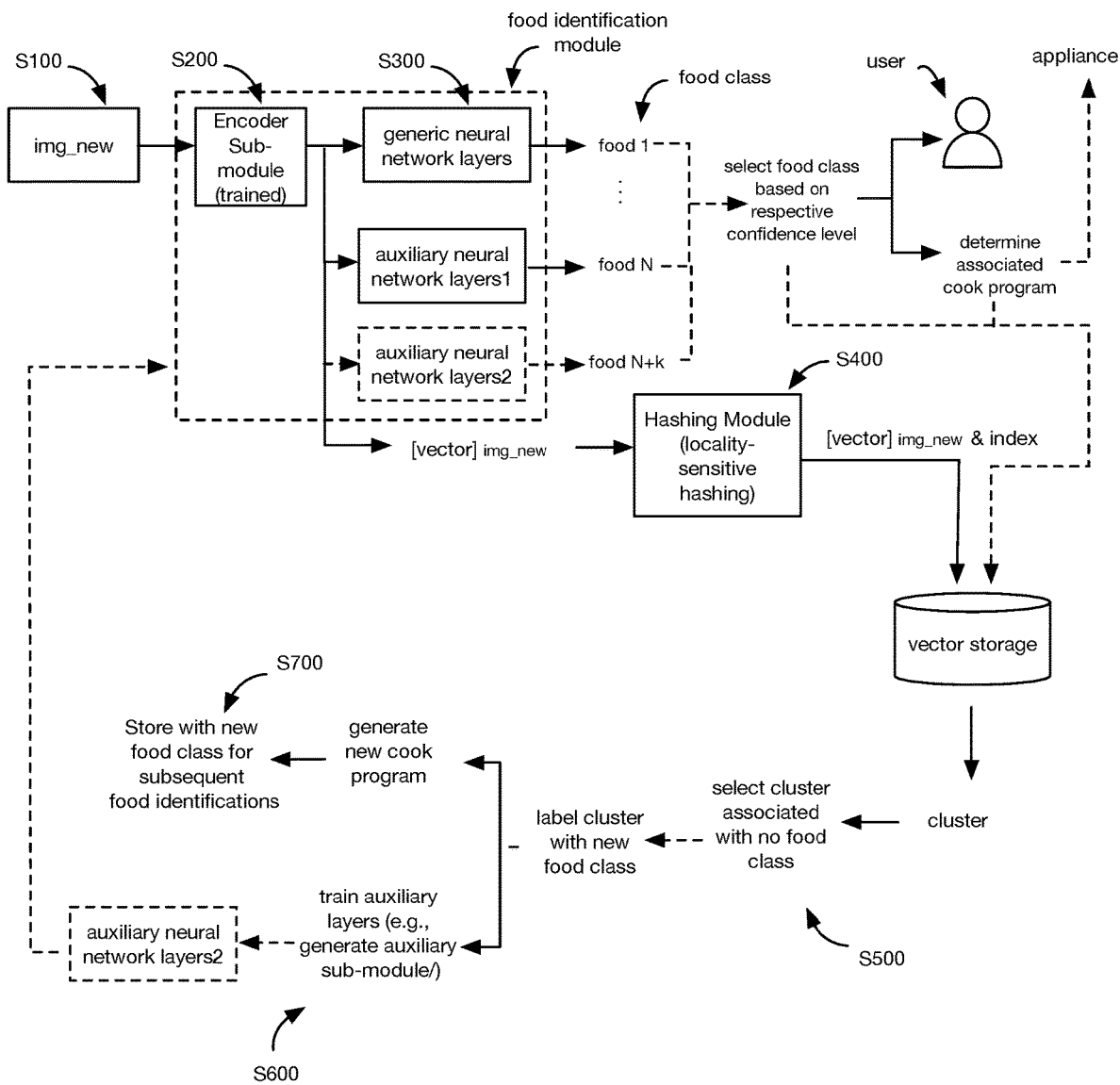
FIG. 4 depicts a variant of the method.

In a first example, the method can include: sampling an image of the current cook cavity; determining an image representation using the image; and determining a food class (e.g., chicken, pizza, etc.) based on the image representation (e.g., as depicted in FIG. 3). When the food class is known, the food class can be used to determine a cook program associated with the food class, and the appliance can automatically cook the food according to the associated cook program (e.g., as depicted in FIG. 4). When the food class is unknown, the method can include determining a new food class based on the image representation (e.g., by querying the user, by automatically assigning a label to the image representation, etc.), updating the food identification module with the new food class (e.g., based on the image representation), and determining a cook program associated with the new food class (e.g., based on the cook program used to cook the food depicted in the image), an example of which is depicted in FIG. 3.

In a second example (example shown in FIG. 4), the method includes: capturing an image of food within the cook cavity of an appliance; extracting a vector representative of the food from the image (e.g., using a base network; using a first sub-module; using a first set of neural network layers; using an encoder; etc.); classifying the food based on the vector (e.g., using a generic sub-module; using a second set of neural network layers trained to recognize a predetermined set of food classes); determining cooking instructions for the food (e.g., automatically retrieved based on the food class; received from the user); and cooking the food according to the cooking instructions. The vector (and optionally, associated cooking instructions) can optionally be stored with similar vectors associated with the appliance. For example, the vector can be hashed and/or clustered within a database of food vectors based on vector distance or proximity. When a cluster satisfies a new class condition (e.g., the cluster size exceeds a threshold, an addition rate exceeds a threshold, distance from predetermined clusters or representative vectors exceed a threshold, etc.), the system can automatically train an auxiliary sub-module (e.g., third set of neural network layers) on the vectors within said cluster to recognize the new food class associated with the cluster (e.g., using few-shot training). The new food class can optionally be associated with a new cooking program, determined based on the cooking instructions previously associated with the training vectors. The auxiliary sub-module can then be deployed (e.g., in parallel) with the second sub-module (e.g., wherein both receive vector values from the first sub-module) to recognize the auxiliary class during runtime. A different auxiliary sub-module can be trained for each new class that is detected, or the same auxiliary sub-module can be retrained each time a new class is detected. The auxiliary sub-module can be personalized (e.g., specific to the given appliance or user) or universal (e.g., derived from and/or shared by multiple appliances or users).

In an illustrative example, a user can provide a custom cook program, optionally provide a food class (e.g., label), and optionally a set of images for an unknown food. When images are provided, the images are then used to generate a personalized classifier head (e.g., specific to the user account, specific to the appliance instance, etc.), wherein the custom cook program is associated with the personalized classifier head. The personalized classifier head can be generated using: weight imprinting (e.g., using features from a base network, trained to identify a plurality of food classes); classifier head retraining (e.g., using few-shot learning); secondary model training (e.g., using few-shot training); and/or otherwise generated. During subsequent cooking sessions, an image of the cook cavity can be run through the base network, wherein the features from the base network can be provided to a global head (e.g., set of layers configured to identify the plurality of food classes) and the personalized head (e.g., customized head; set of layers configured to identify custom, new, personalized, or previously unknown food classes, or food classes not recognized by the global head). The final results (e.g., final classification) can be determined based on the outputs of the global head and the personalized head (e.g., the output with the highest confidence score is selected, the outputs are fused, etc.), wherein the cook program associated with the final result (e.g., final classification) is selected and used to cook the detected food. In variants, the personalized head's custom cook program is used when personalized and global heads' confidence scores are comparable (e.g., to redirect the appliance to use the custom cook program for a given food class or a custom food class with similar appearance to a known food class, etc.).

As an illustrative example, a method for cook program creation can include: capturing an image of a food (e.g., one or more tortillas, etc.) which is not associated with any pre-existing/generic food class (e.g., probability of each food class below a predetermined threshold, user rejects attempted classification by the system, etc.); receiving a label for the food class (e.g., from a user at the cooking appliance which captures the image; from an expert—such as a remote human manually evaluating the image; etc.); receiving cooking instructions to cook the food (e.g., from the user—such as baking at 350 F for 2 minutes in the case of a tortilla); and generating a new food class (e.g., within the auxiliary sub-module and/or generic sub-module) based on the cooking instructions and/or the image (e.g., from the features output by the base model). Subsequently, when a user places the food (e.g., tortilla) into a cooking appliance (e.g., same/local cooking appliance, different/remote cooking appliance), the system can: capture a second image of the food, classify it within the new food class (e.g., using a new classification head trained on the image), and suggest the cooking instructions previously used for the food.

3. Benefits

The method can confer several benefits over conventional systems.

First, variants of the technology can confer a more personalized experience by automatically recognizing new, custom, and/or previously-unknown foods by training a personalized network and/or a new classification head to recognize said food. In some embodiments, this can be performed even with minimal training data (e.g., less than 10, 50, 100, 500 images, etc.), such as by using few-shot, zero-shot, or transfer learning. In some embodiments, this training can be performed automatically, without manually-guided training (e.g., wherein the training hyperparameters are not manually specified per training epoch).

Second, variants of the technology can automatically register custom cook programs for known or new food classes. This can be accomplished by automatically registering a cook program for the food class by storing cooking instructions entered at the appliance during previous cook sessions of similar-looking foods (e.g., as determined based on the image representations' similarities), such that the appliance can automatically cook the food type after the new food class is added to the food identification module (e.g., after S500). In variants, new food classes can enable personalized cook program generation (e.g., personalizing cooking programs for foods already extant in a universal datastore), personalized characterization of foods based on a user cooking history (e.g., a vegan user may prefer an image of a patty to be classified as a vegetable burger patty as opposed to a ground beef patty), and/or expansion of a global cook program dataset based on user-defined food classes/cooking programs.

Third, variants of the technology can automatically identify new food classes. In variants, this can be accomplished by clustering the food features (e.g., extracted from the image, extracted from the cook context or parameters, etc.) in feature space (e.g., image space), wherein new clusters can be treated as new food classes. The new food classes can be automatically recognized in subsequent cook sessions, be used for automated recipe or food class discovery, be used for global model retraining, or otherwise used.

Fourth, variants of the technology can search the datastore in linear time rather than in polynomial time because the image representations are stored in the datastore using locality sensitive hashing. This can enable fast operations on the image representations stored in the datastore (e.g., lookup for clustering in S500, etc.).

Fifth, variants of the technology can provide increased privacy by training the customized (e.g., personalized) classification module locally, wherein the images and/or custom cook programs are only stored and/or used by the appliance, and not sent to a remote system.

Sixth, variants of the method and/or system can provide technical solutions necessarily rooted in computer technology (e.g., automatic creation/identification of food classes based on images, etc.) to overcome issues specifically arising with computer technology (e.g., food identification, datastore searches, determination of food classes, etc.). In an example, the system and/or method can automatically translate images into an image representation (e.g., a vector) which can be used to efficiently search, sort, and/or index foodstuff images.

However, the method and system can confer any other suitable benefits.

4. System

The method is preferably performed using the system, an example of which is shown in FIG. 2, which can include: an appliance 110, one or more sensors 120, a food identification module 130, and/or any other components. The system can optionally include: a learning module 140, a datastore 150, a comparison module 160 and/or any other suitable components. However, the system can include any other suitable elements. The system functions to facilitate execution of the method; however, the method can be performed using any other suitable system.

The appliance 110 can function to perform one or more elements of the method, to automatically cook the food, and/or perform any other functionality. The appliance can include a cook cavity, one or more heating elements, a processor, a memory, and/or any other components.

The appliance can define a cook cavity that receives food, accessories (e.g., plate, pan, baking sheet, pot, etc.), racks, and/or other items. The cook cavity can include the heating elements, and additionally cooling elements, convection elements, and/or other cooking elements. The cook cavity can be accessible through a door (e.g., side door, top door, etc.) or otherwise accessed. The cook cavity can be associated with cavity measurements that monitor parameters of the cook cavity. The cavity measurements can include images, videos, audio, vibration, weight changes, light changes, temperature, and/or any other suitable measurement. However, the appliance can include any other suitable cooking cavity.

The appliance can include a processor (e.g., microprocessor, CPU, GPU, etc.), a communication system (e.g., wired or wireless system), memory, and/or any other suitable elements.

Examples of appliances include: ovens, toasters, slow cookers, air fryers, warming drawers, broilers, cooktops, grills, smokers, dehydrators, and/or any other suitable appliance. A specific example of an appliance is described in U.S. application Ser. No. 16/793,309, filed 18 Feb. 2020, which is incorporated herein in its entirety by this reference. However, other appliances can be used.

The system can include one or more sensors 120 for determining the cavity measurements. More specifically, the sensors can function to monitor appliance operation parameters and/or foodstuff parameters (e.g., for foodstuff classification and/or during cooking). The sensors can be arranged to monitor the cook cavity (e.g., be directed toward the cook cavity), but can alternatively monitor the door opening, the rack, and/or any other suitable portion of the cavity. The sensors can include optical sensors (e.g., image sensors, light sensors, etc.), door sensors, audio sensors, temperature sensors, volatile compound sensors, weight sensors, humidity sensors, depth sensors, location sensors, inertial sensors (e.g., accelerators, gyroscope, magnetometer, etc.), impedance sensors (e.g., to measure bio-impedance of foodstuff), hygrometers, insertion temperature sensors (e.g., probes), cooking cavity temperature sensors, timers, gas analyzers, pressure sensors, flow sensors, door sensors (e.g., a switch coupled to the door, etc.), power sensors (e.g., Hall effect sensors), or any other suitable sensor. The sensors can be directly or indirectly coupled to the cooking cavity. The sensors are preferably integrated into the appliance, but can additionally or alternatively be separate. The sensors can be directly or indirectly mounted to the cavity. The sensors can be mounted to the top, bottom, left, right, front (e.g., door), back, corner, and/or any other suitable portion of the appliance or cook cavity. Alternatively, the sensors can be separate from the cavity and/or appliance, and be part of a user device, external monitoring system, and/or any other suitable system. The sensors can be connected to and controlled by the processor of the appliance, a user device, or be otherwise controlled. The sensors are preferably individually indexed and individually controlled, but can alternatively be controlled together with other like sensors.

In one variation, the sensors can include an optical sensor that functions to measure optical data about the cooking cavity (e.g., foodstuff within the cooking cavity 200). In a first example, the sensor includes a camera configured to record images or video of the cooking cavity (e.g., food cooking within the cavity). The camera can be a CCD camera, stereocamera, hyperspectral camera, multispectral camera, video camera, wide angle camera (e.g., a fisheye camera with a fisheye lens, a rectilinear camera with a rectilinear lens, etc.) or any other suitable type of camera. In a specific example, the wide-angle camera can have an approximately 180-degree field of view (e.g., within 10 degrees or less). The camera can be cooled by the convection elements, by a separate cooling system (e.g., a radiator and fan, watercooling, etc.), or remain uncooled. The camera can record images using radiation emitted or reflected by heating elements of the appliance, by the foodstuff, by the cooking cavity walls, by an emitter, or by any other suitable radiation source. Alternatively or additionally, the camera can record images using ambient light.

The system can include a food identification module 130 which can function to generate image representations (e.g., feature vectors) and/or determine food classes for the image representations. The food identification module can include all or portions of one or more: classifiers (e.g., multiclass classifiers, binary classifiers, etc.), segmentation algorithms, autoencoders, and/or any other suitable algorithm. The algorithms can include neural networks (e.g., fully-connected, CNN, RNN, etc.), decision trees, SVMs, and/or any other suitable algorithm.

The food identification module and/or each submodule can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Examples of reinforcement learning include using a brute force approach, value function approach (e.g., Monte Carlo method, temporal difference method), direct policy approach, or otherwise reinforced. Examples of supervised learning include using: analytical learning, artificial neural network, backpropagation, boosting (meta-algorithm), Bayesian statistics, case-based reasoning, decision tree learning, inductive logic programming, Gaussian process regression, group method of data handling, kernel estimators, learning automata, minimum message length (decision trees, decision graphs, etc.), multilinear subspace learning, Naive Bayes classifier, nearest neighbor algorithm, probably approximately correct learning (pac) learning, ripple down rules, a knowledge acquisition methodology, symbolic machine learning algorithms, subsymbolic machine learning algorithms, support vector machines, minimum complexity machines (mcm), random forests, ensembles of classifiers, ordinal classification, data pre-processing, handling imbalanced datasets, statistical relational learning, or otherwise learned. Examples of unsupervised learning include using a method of moments approach or otherwise learned.

The food identification module and/or each submodule can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution neural network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each module of the set can additionally or alternatively be a: probabilistic module, heuristic module, deterministic module, or be any other suitable module leveraging any other suitable computation method, machine learning method, or combination thereof.

The system can optionally include or be used with a learning module, which can be used to validate, verify, reinforce, calibrate, or otherwise update the foodstuff identification module and/or an individual submodule(s) therein (e.g., based on newly received, up-to-date measurements of a cooking session; based on user inputs, past foodstuff measurements recorded during cooking sessions; historic foodstuff measurements recorded during past cooking sessions, or be updated based on any other suitable data) and/or facilitate execution of S600 of the method. All or a subset of the modules can be run or updated: once; every year; every time the method is performed; every time an unanticipated measurement value is received; or at any other suitable frequency. All or a subset of the modules can be run or updated concurrently, serially, at varying frequencies, or at any other suitable time. All or a subset of the modules can be validated, verified, reinforced, calibrated, or otherwise updated based on newly received, up-to-date data; past data or be updated based on any other suitable data. All or a subset of the modules can be run or updated: in response to receipt of a new foodstuff classification by a user (e.g., new user confirmation), cluster determination by the comparison module, in response to determination of a discrepancy between the module output(s) and the actual foodstuff class, or at any other suitable frequency.

The food identification module can include a base network and a generic sub-module (e.g., global classification head; global classification module; multi-class classifier; etc.), and can optionally include one or more auxiliary sub-modules (e.g., multi-class classifier, single class classifier, personalization heads, etc.) and/or any other suitable sub-module. The sub-modules can be: subsequent layers after the base network, subsequent models receiving an output of the base network, and/or be otherwise constructed. The sub-modules can include any of the algorithms described above, be layers of a neural network (e.g., a cascade of neural networks), and/or be otherwise configured. Sub-modules of the food identification module can be executed and/or trained at the appliance (e.g., using the appliance's processor), at the remote computing system, and/or by any other computing system.

The base network can function to generate an image representation (e.g., a vector) for images captured by the appliance. A base network can include neural networks (e.g., CNN, fully-connected network, etc.), neural network layers, an encoder, heuristics, rules, and/or any other suitable model(s). During inference, the (pre-trained) base network preferably receives an image as input and generates an image representation for the image. A base network can be trained (e.g., pretrained prior to execution of the method) by providing, as input, an image pair and a similarity score that indicates whether or not the image pair depict images of the same food or different foods, and outputs separate vector representations for each image of the pair (e.g., determined serially and/or in parallel). The distance between the image representations is compared to the similarity score and the comparison is used to train the base network to generate similar image representations for similar foods and dissimilar image representations for dissimilar foods. The base network (e.g., encoder) can be iteratively trained on multiple image pairs with associated similarity scores. Alternatively, an autoencoder can be trained using the images, then decoupled into the constituent encoder, which is retained, and a decoder, which is discarded. However, the base network can be otherwise trained. The base network can be trained at the appliance, at the remote computing system, and/or at any other computing system.

In a first variant, the base network includes the first N layers of the food identification neural network. In a second variant, the base network is a separate network from the food identification neural network (e.g., or a generic/universal portion thereof).

However, the food identification module can include any other suitable base network. Alternatively, the system can exclude a base network and/or be otherwise configured.

A generic sub-module can receive, as an input, the image representation, and output a probability score associated with multiple food classes. The generic sub-module can include neural networks (e.g., CNN, fully-connected, etc.), neural network layers, rule, heuristics, and/or any other suitable model(s). The generic sub-module is preferably pre-trained to recognize a common set of foods across a fleet of appliances (e.g., using supervised learning; using the image representations and food class labels associated with the image representations; with any suitable machine learning techniques, etc.). However, the generic sub-module can include any other components.

An auxiliary sub-module can function to tune the generic classifications to the preferences of a user, facilitate user customized cook program creation, and/or tune the classification to a particular user cooking history (e.g., previous image representations/identifications). The auxiliary sub-module can receive, as an input, the image representation, and output a probability score associated with one or more food classes (e.g., be a binary classifier or a multi-class classifier). When the auxiliary sub-module outputs probability scores for multiple food classes, the food class with a probability above a predetermined threshold (e.g., 0.7, 0.8, 0.9, 0.95, etc.), the highest probability (e.g., maximum confidence), and/or satisfying another condition can be selected as the food class. The auxiliary sub-module is preferably a version of the generic sub-module that can be updated in S600 to recognize new food classes, different from the generic food classes. The auxiliary sub-module can be unique for each appliance and/or shared between multiple appliances. For example, the auxiliary sub-module trained on data from one appliance can be shared with other appliances. However, the auxiliary sub-module can include any other components.

The food identification module (e.g., the original food identification module) is preferably trained end to end (e.g., the base model and the global classification head are trained together) to identify a predetermined set of food classes (e.g., using a training data set including labelled images for each food class of the set) and optionally to identify that the food is unknown (e.g., not within the set of food classes that it is trained to identify), but can alternatively be trained separately. The food identification module is preferably trained by a central platform, but can alternatively be trained locally.

Figure 8:
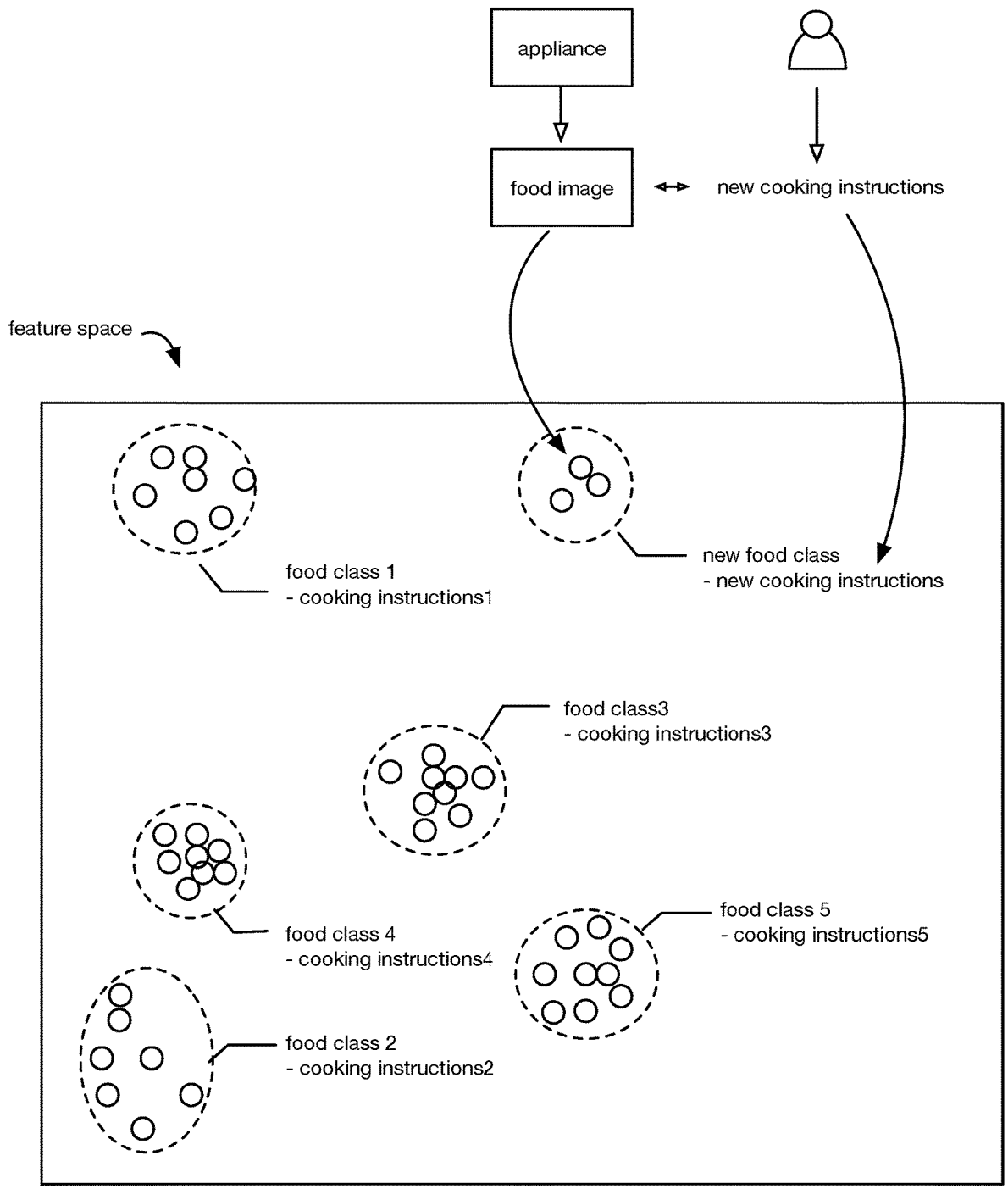
FIG. 8 is an illustrative example of clustering-based new food class determination.
Figure 9:
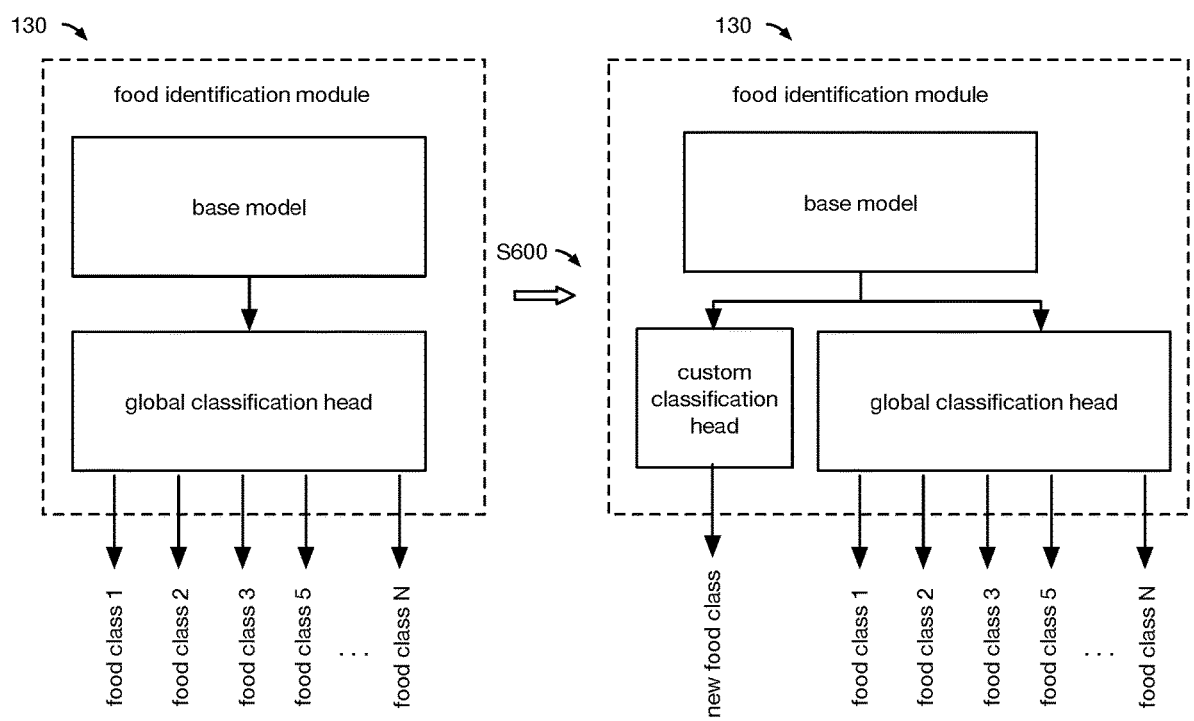
FIG. 9 is an illustrative example of a food identification module and an updated food identification module.

The auxiliary sub-modules (e.g., custom classification head; custom classification module) can be trained or determined independently from the rest of the food identification module (e.g., based on features output by the pretrained or tuned base model; independent of the global classification head; etc.) based on images of the food it is intended to identify, but can alternatively be otherwise trained. The auxiliary sub-module(s) can then be attached (e.g., appended) to the original food identification module to create an updated food identification module (e.g., attached or connected to the base model, example shown in FIG. 9; attached in parallel with the global classification head; attached in parallel with the base model; attached after the generic sub-module, etc.). The auxiliary sub-module can be trained: when an unknown food is detected, when a threshold number of food measurements (e.g., images) have been received, when a user requests training (e.g., customization, personalization, etc.), when a user indicates that the food class output by the global classification head is incorrect, and/or at any other suitable time. The training data for the auxiliary sub-module can be determined: by a user; from user appliance use history; and/or otherwise determined. The training data preferably includes images of a single type of food (e.g., a single new food class), but can alternatively include images of multiple types of food. The images of the single type of food can be automatically identified based on: appearance (e.g., using feature vector comparisons, feature vector distances, clustering, S400, etc.; example shown in FIG. 8; wherein images depicting foods having similar appearance are included in the training data, and images depicting nonsimilar foods are excluded); cooking artifacts associated with food cooking (e.g., cook history, cooking instructions, internal temperature measurements, cavity temperature measurements, fan speeds, radiation amount and/or type, location, color change over time, appliance parameters, food parameters, etc.); and/or any other suitable set of cook parameters and/or features.

However, the food identification module can include any other suitable modules/sub-modules.

The optional comparison module functions to generate comparisons between image representations generated by the foodstuff module, which can be used to index/store and/or cluster image representations (e.g., to facilitate execution of Blocks S400 and S500 of the method). The comparison module can include: a hashing module which executes one or more hash functions (e.g., locality-sensitive hashing, cryptographic hash functions, etc.), KD-trees, and/or any other algorithm for organizing data.

In a first variant, an image representation is compared to another prior image representation (e.g., picked at random from the prior image representations) and the distance between the representations (e.g., Euclidean, Manhattan, Minkowski, Jaccard Index, cosine similarity, etc.) is computed. The image pair and the distance can be used by the comparison module to store the image representation.

In a second variant, an image representation can be hashed using locality-sensitive hashing (e.g., using a hashing technique that maximizes hash collisions, such as bit sampling for Hamming distance, min-wise independent permutations, random projection, etc.). After the image representation is hashed, the image representation can be stored in the datastore according to the hash. The image representation is preferably stored near similar vectors (e.g., based on the respective hash values; result of locality-sensitive hashing), but can additionally or alternatively be otherwise stored. In one example, the image representation hash can be one of a set of "buckets," wherein images resulting in the same hash value (e.g., in the same "bucket") can be treated as a "cluster." The image representation can be optionally stored with the food class, associated probability score (e.g., determined in S300), with no food class, with a cook program (e.g., determined based on user input, the cavity measurements from S100, etc.), and/or any other information.

The system can be used with cook programs (e.g., including operation instructions, cook primitives, etc.), cook primitives (e.g., "bake", broil"), operation instructions (e.g., operation targets, duration, series, etc.), cook instructions (e.g., machine instructions), and/or any other suitable instruction elements. The instruction elements can be specific to an appliance type or class, or globally applicable. The instruction elements can be specific to a user, a specific appliance, global, or otherwise applicable.

The cook programs can be authored: manually, automatically (e.g., based on historical cook programs for the food class, extracted from user or population cook history), and/or otherwise determined. When the cook program is authored automatically, the cook program can be determined from: the average cook parameter values, the median cook parameter values, the most frequent cook parameter values, most important cook parameter values (e.g., the parameter values that are most constant across the population), and/or otherwise determined. The cook programs can be selected (e.g., for a single cook session): manually, automatically (e.g., based on the detected food class), and/or otherwise determined.

In variants, the cook programs can be the cook programs, cooking instructions, and/or resource instructions as described in U.S. application Ser. No. 16/793,309, filed 18 Feb. 2020, and/or U.S. application Ser. No. 17/126,973, filed 18 Dec. 2020, each of which is incorporated in its entirety by this reference.

In variants, cook programs can include a series of operation instructions, cook primitives, and/or any other suitable elements. The cook primitives can include appliance operation settings. The cook primitives can be associated with a predefined, static and/or dynamic set of operation instructions, automatically adjusted operation instructions (e.g., adjusted based on visual and/or temperature cues as the food cooks), or other operation instructions. The cook primitives can be manually selected, automatically selected, and/or otherwise selected. Examples of the cook primitives include preheat, bake, broil, roast, fry, dehydrate, and/or any other suitable cook primitive. The operation instructions can include: operation targets (e.g., target power output, power input, power cycling, etc.), operation duration, timeseries, and/or any other suitable instruction. The operation instructions can be machine instructions (e.g., executable by the cooking appliance 110), user input instructions, and/or any other suitable instructions. However, cook programs can be otherwise defined.

Each food class is preferably associated with a set of instruction elements (e.g., a cook program). The cook programs can be predetermined, generated automatically by the appliance (e.g., by associating cook primitives from a user with an image), generated manually by a user and/or operator, or otherwise generated.

However, the system can additionally or alternatively include any other suitable elements.

5. Method

The method for automatic cook program personalization preferably includes: optionally sampling cavity measurements of the current cook cavity S100; determining an image representation using the cavity measurements S200; determining a food class based on the image representation S300; optionally comparing the image representation to prior image representations S400; optionally determining a new food class based on the image representation S500; optionally updating a food identification module with the new food class S600; and optionally determining a cook program associated with the new food class S700. However, the method can include any other suitable elements.

The method is preferably performed by the system disclosed above, but the method can be otherwise performed. The method is preferably performed in real- or near-real time, but can alternatively be performed asynchronously.

The method can optionally include training one or more sub-modules of the food identification module, such as to determine weights for each of the sub-modules.

5.1 Sampling Cavity Measurements of the Current Cook Cavity S100.

Sampling cavity measurements of the current cook cavity S100 can function to determine an image for food class determination in S200, sample other measurements (e.g., temperature, light, etc.) that can be used to determine a cook program in S600, and/or perform any other functionality.

The cavity measurements can include images, videos, audio, vibration, weight changes, light sensors, temperature, and/or any other suitable measurements. The cavity measurements are collected using the sensors 120 and/or at the appliance 110, but can include any other suitable cavity measurements and/or can be otherwise suitably collected. The cavity measurements can include images which preferably depict the food within the cook cavity (e.g., after the food is inserted into the cavity), but can additionally or alternatively depict the food as the food is inserted into the cook cavity, and/or the images can otherwise depict the food.

Sampling the cavity measurements is preferably performed in response to food insertion into the cook cavity, but can additionally or alternatively be performed periodically at a predetermined interval (e.g., every 30 seconds, every minute, every 5 minutes, once a day, etc.), and/or at any other suitable time. Additionally or alternatively, cavity measurements can be sampled in response to a receipt of user classification request (e.g., at the appliance, at a connected user device) and/or receipt of a user request to generate a personalized food class (and an associated cooking program).

In a first variant, an image can be captured of the current cook cavity, after food insertion, for determining a food class in S200. In a second variant, cavity measurements are captured for both S200 and cook program generation in S700. In a third variant, a plurality of images of the cooking cavity can be captured in response to a request for cook program creation and/or food class creation.

Cavity measurements can optionally by transmitted to a remote data store and/or remote processing system to facilitate subsequent model training (e.g., according to S600), cook program tuning/modification, and/or custom cook program creation. Alternatively, cavity measurements can be stored in a local memory of a cooking appliance and/or user device, and/or can be otherwise stored. Alternatively, cavity measurements and/or images of foodstuff can be temporarily stored and/or otherwise used exclusively during execution of cook programs.

However, the cavity measurements can be otherwise determined and/or used. Alternatively, cavity measurements can be received from a remote appliance (e.g., in response to completion of a cook program, in response to a user request to generate a custom cook program, in response to a user over-riding a classification according to S300 at a remote appliance, etc.) and/or the datastore, which can be used for subsequent data processing.

5.2 Determining an Image Representation Based on the Cavity Measurements S200.

Determining an image representation based on the cavity measurements S200 can function to determine an image representation for the image captured in S100 (e.g., extract feature values from an image). The image representation is preferably a vector (e.g., array), but can alternatively be a matrix (e.g., M×N matrix) or other representation. The image representation is preferably determined (encoded) by the base network, but can additionally or alternatively be determined by any other suitable sub-module. The base network functions to generate a representation of an image that has reduced dimensionality from that of the image (e.g., in the form of a vector representation). In a first example, the image representation can be the output of an intermediate layer of a neural network. In a second example, the image representation can be the output of a neural network.

The base network can include neural networks (e.g., CNN, fully-connected network, etc.), neural network layers, heuristics, rules, and/or any other suitable model.

During inference, the (pre-trained) base network preferably receives an image as input and generates an image representation for the image. The image representation can be calculated at the appliance, but can additionally or alternatively be calculated at a remote computing system (e.g., the image can be captured by the appliance and sent to the remote computing system to calculate the image representation) or otherwise calculated.

A base network can be trained or tuned (e.g., pretrained prior to execution of the method) by providing, as input, an image pair and a similarity score that indicates whether or not the image pair depict images of the same food or different foods, and outputs separate vector representations for each image of the pair (e.g., determined serially and/or in parallel). The distance between the image representations is compared to the similarity score and the comparison is used to train the base network to generate similar image representations for similar foods and dissimilar image representations for dissimilar foods. The base network can be iteratively trained on multiple image pairs with associated similarity scores. Alternatively, an autoencoder can be trained using the images, then decoupled into the constituent encoder, which is retained, and a decoder, which is discarded. However, the base network can be otherwise trained. The base network can be trained at the appliance, at the remote computing system, and/or at any other computing system.

In a first variant, the base network is the first N layers of the food identification neural network. In a second variant, the base network is a separate network from the food identification neural network (e.g., or a generic/universal portion thereof).

The encoding of the images can be consistent across appliances (e.g., share an identical/globally unified process), vary between appliances (e.g., based on hashing or appliance-specific encoding), can be unique for individual appliances, and/or image encoding into image representations can be otherwise suitably implemented.

However, the image representation can be otherwise determined.

5.3 Determining a Food Class Using the Image Representation S300.

Determining a food class using the image representation S200 can function to determine a food class (e.g., chicken, pasta, pizza, etc.) for the food inserted into the cook cavity, which can be used to determine a cook program in S700.

The food class can be one of a set of generic food classes (e.g., common to all appliances), a set of personalized food classes (e.g., only recognizable on the user's appliance, user customized version of a generic class, etc.) and/or unknown.

The food class can be determined using a generic sub-module (e.g., configured to identify the food as one of the generic food classes; a universal/global sub-module shared by multiple appliances/user accounts, etc.), an auxiliary sub-module (e.g., configured to identify the food as one of the personalized food classes), and/or any other suitable sub-module(s) of a foodstuff identification module.

Figure 7A:
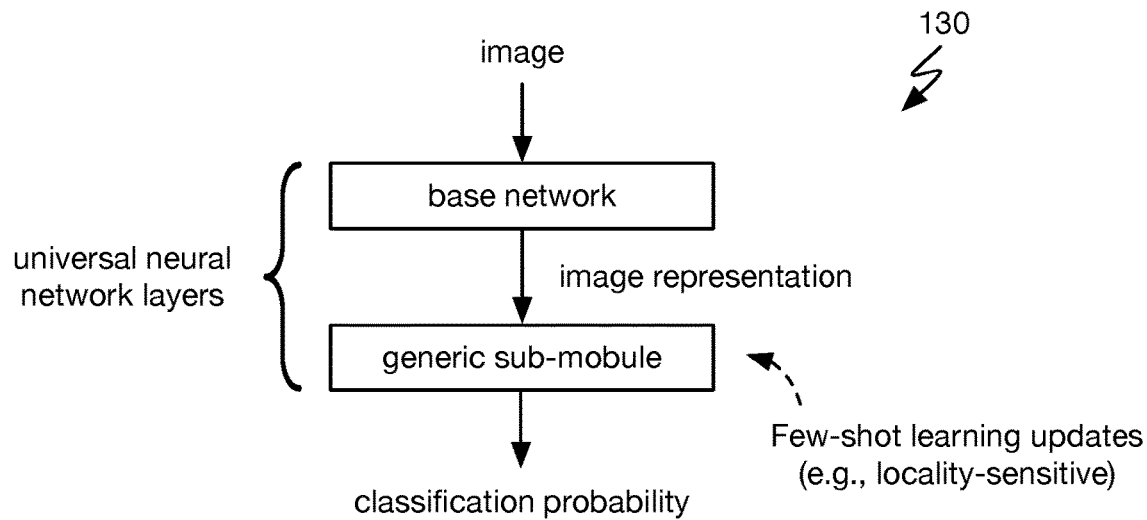
FIGS. 7A-C are a first, second, and third variant of a food identification module in a variant of the system and/or method.

The generic sub-module can receive, as an input, the image representation, and output a probability score associated with multiple food classes (an example is shown in FIG. 7A), wherein the food class with a probability above a predetermined threshold (e.g., 0.7, 0.8, 0.9, 0.95, etc.), the highest probability, or satisfying another condition can be selected as the food class for the food depicted in the image. The generic sub-module can include neural networks (e.g., CNN, fully-connected, etc.), neural network layers, rule, heuristics, and/or any other suitable model. The generic sub-module is preferably pre-trained to recognize a common set of foods across a fleet of appliances (e.g., using supervised learning; using the image representations and food class labels associated with the image representations; etc.). However, the generic sub-module can include any other components.

The auxiliary sub-module functions to tune the generic classifications to the preferences of a user, facilitate user customized cook program creation, and/or tune the classification to a particular user cooking history (e.g., previous image representations/identifications).

Figure 7B:
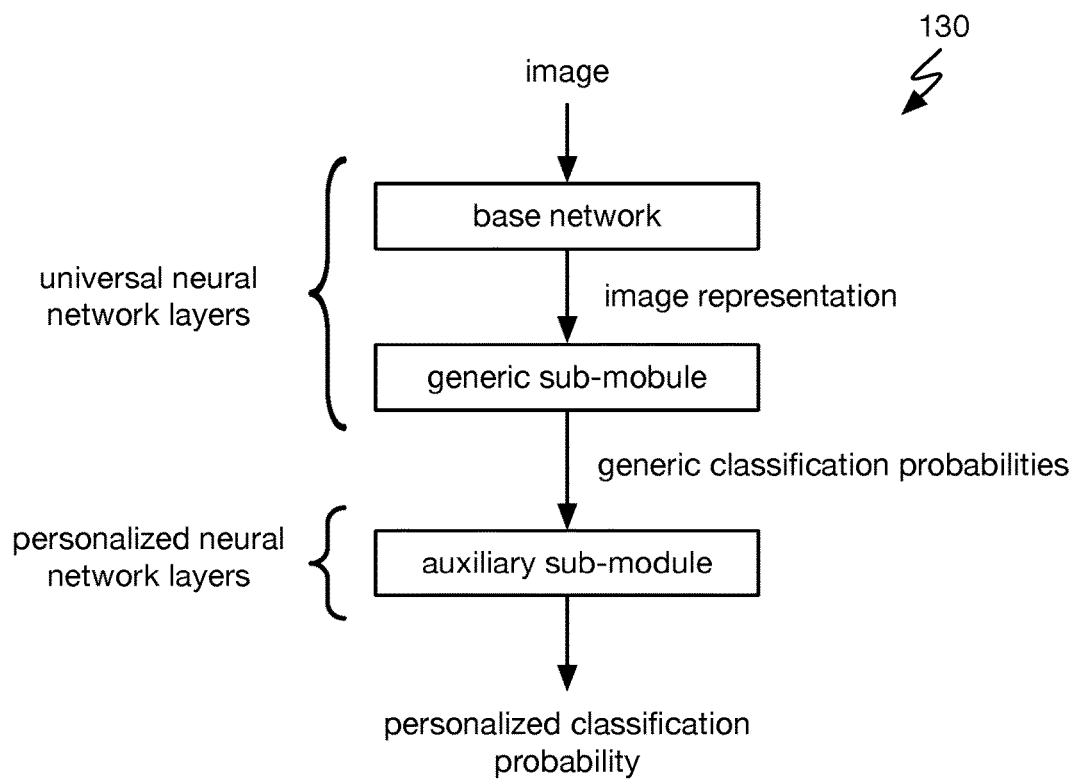
Figure 7C:
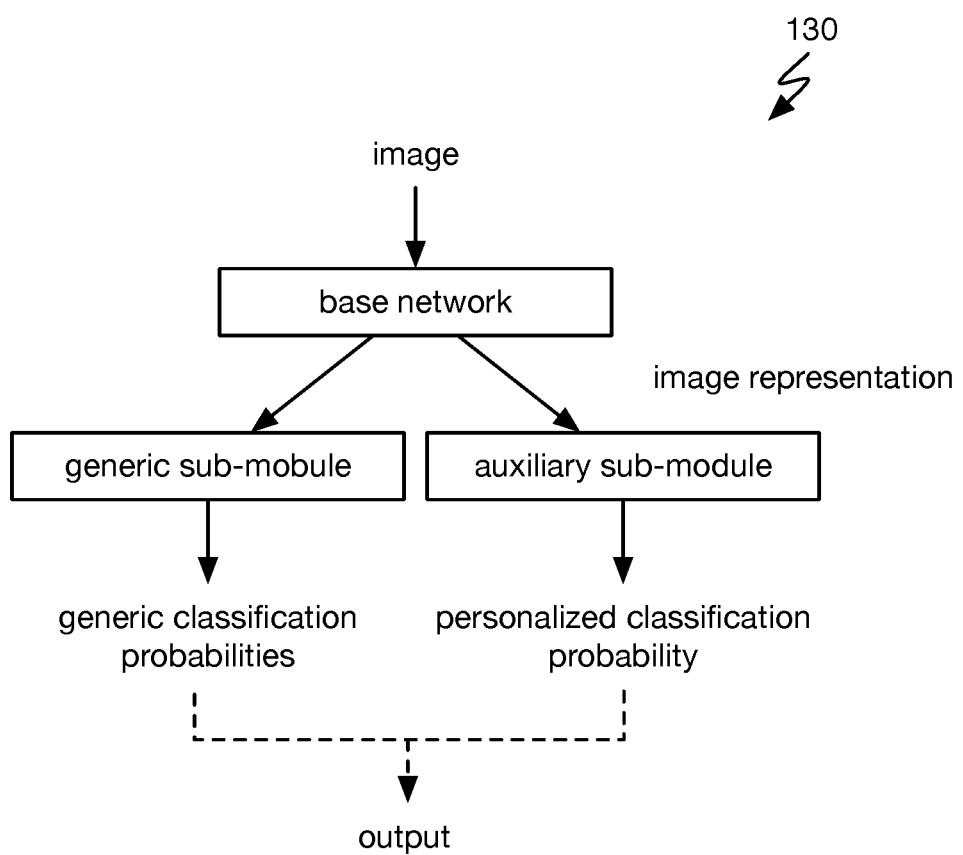

The auxiliary sub-module can receive, as an input, the image representation, and output a probability score associated with one or more food classes (e.g., be a binary classifier or a multi-class classifier). When the auxiliary sub-module outputs probability scores for multiple food classes, the food class with a probability above a predetermined threshold (e.g., 0.7, 0.8, 0.9, 0.95, etc.), the highest probability, and/or satisfying another condition can be selected as the food class. The auxiliary sub-module is preferably a version of the generic sub-module that can be updated in S600 to recognize new food classes, different from the generic food classes. The auxiliary submodule can operate sequentially/serially in conjunction with the generic submodule (e.g., tuning output probabilities/weights based on the particular user/appliance history and/or preferences; an example is shown in FIG. 7B) and/or in parallel with the generic submodule (e.g., generating multi-class probabilities for customized user classes; an example is shown in FIG. 7C). The auxiliary sub-module can be unique for each appliance and/or shared between multiple appliances. For example, the auxiliary sub-module trained on data from one appliance can be shared with other appliances. However, the auxiliary sub-module can include any other components. Alternatively, the auxiliary sub-module can be neglected entirely, such as in cases where the generic sub-module is updated to incorporate user-specified food classes (e.g., using few-shot machine learning training techniques; where the custom user classes may be weighted more heavily in the global paradigm based on the appliance/user ID and/or location).

In a first variant of S300, the generic sub-module can determine a food class with a probability above the predetermined threshold, the food class can be used to select an associated cook program, and the cook program can be used to cook the food inserted into the cavity. Optionally the food class can be provided to the user (e.g., as a notification, on the appliance display, etc.). An example is depicted in FIG. 4.

In a second variant, the generic sub-module can fail to identify a food class and the user can be prompted to enter cooking instructions.

In a third variant, the generic sub-module can fail to identify a food class and an auxiliary sub-module can succeed in recognizing a food class (e.g., probability score above the predetermined threshold). The food class from the auxiliary sub-module can then be used to select an associated cook program (e.g., an example is shown in FIG. 4).

In a fourth variant, both the generic sub-module and the auxiliary sub-module can fail to identify a food class (e.g., an example is shown in FIG. 4).

In a fifth variant, a food class can be manually selected and/or validated by a user input (e.g., via a mobile device, touchscreen interface, etc.).

In a sixth variant, a food class can be determined based on a new food class according to S500.

However, the food class can be otherwise determined.

5.4 Comparing an Image Representation to Prior Image Representations S400.

Comparing an image representation to prior image representations S400 can function to index and store the image representation in the datastore. S400 can be performed: for every image, for a subset of images from a cook session, when S300 fails (e.g., when no food class is identified), asynchronously with S100-S300, or at any other suitable time.

Comparing the image representation to prior image representations can be performed by the comparison module. The comparison module can include: one or more hash functions (e.g., locality-sensitive hashing, cryptographic hash functions, etc.), KD-trees, and/or any other algorithm for organizing data.

In a first variant, an image representation is compared to another prior image representation (e.g., picked at random from the prior image representations) and the distance between the representations (e.g., Euclidean, Manhattan, Minkowski, Jaccard Index, cosine similarity, etc.) is computed. The image pair and the distance can be used by the comparison module to store the image representation.

In a second variant, an image representation can be hashed using locality-sensitive hashing (e.g., using a hashing technique that maximizes hash collisions, such as bit sampling for Hamming distance, min-wise independent permutations, random projection, etc.). After the image representation is hashed, the image representation can be stored in the datastore according to the hash. The image representation is preferably stored near similar vectors (e.g., based on the respective hash values; result of locality-sensitive hashing), but can additionally or alternatively be otherwise stored. In one example, the image representation hash can be one of a set of "buckets," wherein images resulting in the same hash value (e.g., in the same "bucket") can be treated as a "cluster." The image representation can be optionally stored with the food class, associated probability score (e.g., determined in S300), with no food class, with a cook program (e.g., determined based on user input, the cavity measurements from S100, etc.), and/or any other information.

S400 can optionally include clustering the image representations, which functions to determine higher-order characterizations of the appliance's cook history, and to identify food class popularity. Additionally or alternatively, feature sets associated with the images (e.g., including image feature values, cooking durations, temperature features, and/or other cooking feature values) can be clustered (e.g., wherein descriptions for image representations herein can be equally applied to said feature sets). The image representations are preferably clustered by the comparison module, but can be otherwise clustered. The comparison module can optionally include a clustering algorithm (e.g., KNN, mean shift clustering, EM clustering, etc.) and/or any other comparison algorithm. The comparison module can cluster the image representation and the prior image representations associated with the appliance, associated with the fleet of appliances, associated with the user, and/or any other suitable prior image representations. The clusters determined by the comparison module can be prioritized (e.g., by size, by user preference, by timestamp associated with the most recently added prior image representation of a cluster, etc.). However, S400 can be otherwise performed.

However, the image representation can be otherwise compared to prior image representations and/or stored. Clusters can be otherwise defined or identified.

5.5 Determining a New Food Class Based on the Image Representation S500.

Determining a new food class based on the image representation S500 can function to determine when a given unknown food is popular with the user, and that an auxiliary sub-module should be trained to identify the unknown food. S500 can be performed when: a predetermined number of prior image representations are similar to the image representation (e.g., a cluster exceeds a predetermined size); a cluster growth rate (e.g., image representation addition rate) exceeds a predetermined threshold); and/or another condition. S500 can be performed with S100-S300, or be performed asynchronously.

Figure 5:
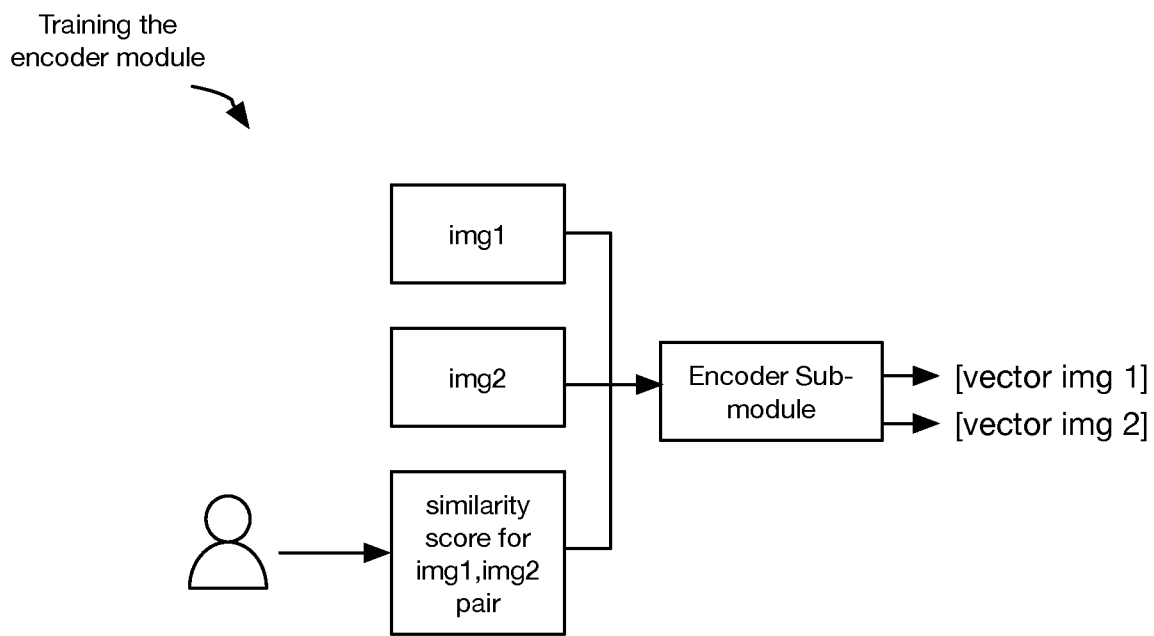
FIG. 5 depicts a partial schematic representation of a variant of the system and/or method.

In a first variant, the new food class can be determined when a cluster size is above a predetermined threshold (e.g., 5, 10, 15, 20, 30, 50, etc.). The new food class can be determined from user input and/or operator input. An example is depicted in FIGS. 3, 4, and 5.

In a second variant, new food classes can be determined for all clusters that are of a predetermined size and are not already associated with a predetermined food class.

S500 can optionally include determining a new food label for the new food class. The label for the new food class can be manually determined from the user, automatically determined (e.g., comparing the image representation to prior image representations determined by the fleet of appliances), automatically assigned (e.g., incremented, randomly generated), and/or otherwise determined. The label can be descriptive (e.g., "fried chicken"), nondescriptive (e.g., "food class 10," a hash value, etc.), and/or another label.

After the new food class is assigned to a cluster, the image representations of that cluster can be used to update the food identification module (e.g., the auxiliary sub-module, the generic sub-module, etc.) in S600. However, the new food class can be otherwise determined.

5.6 Updating the Food Identification Module with the New Food Class S600.

Updating a food identification module with the new food class S600 can function to enable automatic recognition of the new food class by the food identification module for subsequent recognitions (e.g., when a user cooks a certain food repeatedly but the certain food is not recognized by the generic sub-module). The food identification module can be updated using a learning module, which can receive, as input, training data from S500 (e.g., the associated image representations of the cluster, the new image class, etc.), or be otherwise updated. The learning module can update the food identification module using few shot learning (e.g., 10 training examples, 20 training examples, etc.), weight imprinting, and/or any other learning technique. The learning module can update the generic sub-module, update an auxiliary sub-module, and/or generate a new auxiliary sub-module (e.g., when the auxiliary sub-module has not yet been created; an auxiliary sub-module specific to the new food class; etc.). The updated or new sub-module (e.g., generic sub-module, auxiliary sub-module) is preferably a personalized sub-module that is unique to the user's appliance (e.g., is only trained on data from the oven's or user's cook history, is only located on the user's appliance), but can additionally or alternatively be shared by multiple different appliances (e.g., be trained on data from multiple ovens' or users' cook histories; be located on multiple users' appliances; etc.). S600 can be performed on the appliance, remotely, and/or performed on any other suitable computing system.

In a first variant, the auxiliary sub-module is generated by using the same model as the generic sub-module and amending the model to include a new output for the new food class. The model can be initialized using the same weights as the model of the generic sub-module, and/or any other suitable weights. The auxiliary sub-module can be trained using the learning module and the training data described above.

In a second variant, an auxiliary sub-module can be initialized using the previous weights of the model (e.g., from a prior auxiliary sub-module or the generic sub-module). The auxiliary sub-module can be trained using the learning module and the training data described above (e.g., as depicted in FIG. 4), and added to the model (e.g., in parallel or in series with the generic sub-module).

In a third variant, the model of the generic sub-module can be updated to include an output for the new food class and the model can be re-trained using the learning module and the training data described above.

In a fourth variant, a universal auxiliary sub-module (e.g., distributed to multiple appliances) can be learned based on a plurality of personalized sub-modules, wherein each personalized sub-module can be trained on the respective user's cook history. The plurality of personalized sub-modules are preferably related (e.g., by hash value, associated with similar clusters, manually associated together, etc.), but can be unrelated. The universal auxiliary sub-module can be learned by combining (e.g., averaging, learning from, etc.) the personalized sub modules' layers, or otherwise determined.

Figure 6A:
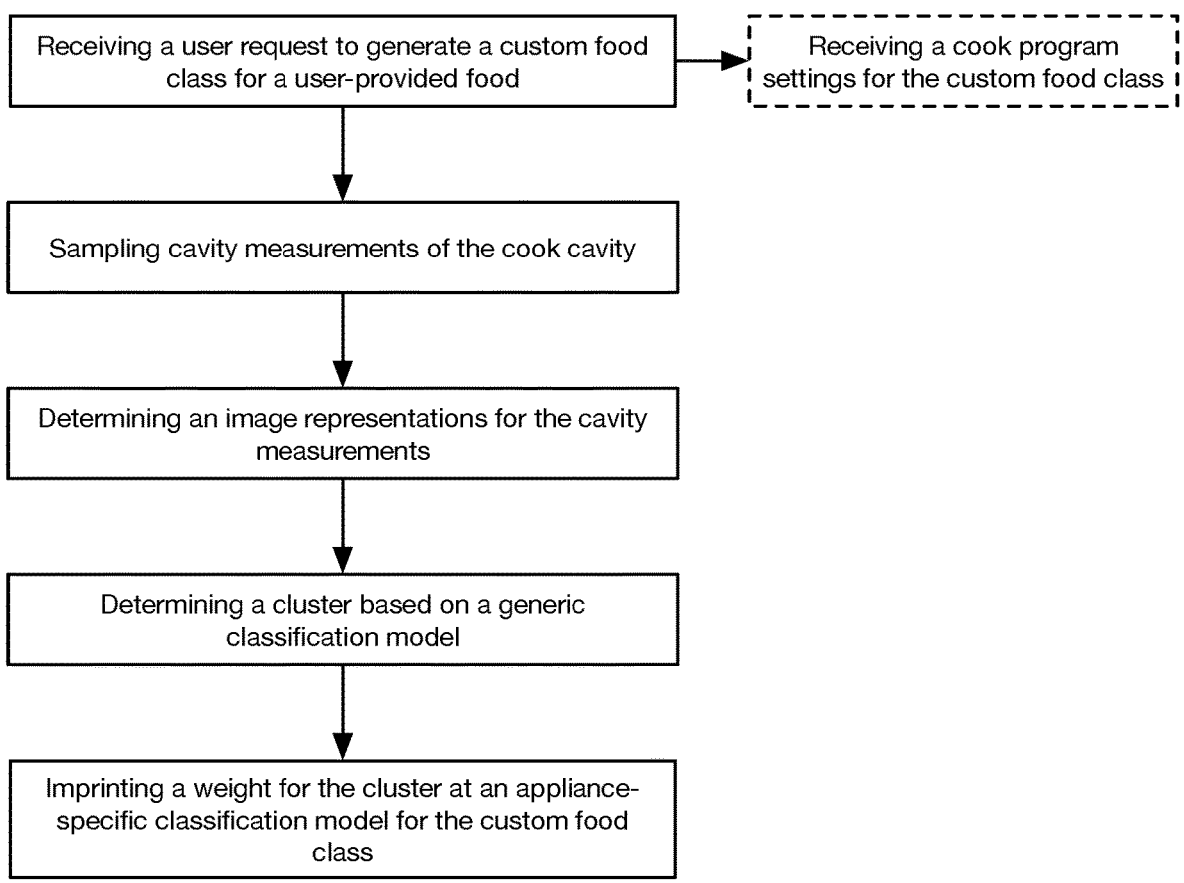
FIG. 6A-B are a first and second flow chart representation of a variant of the method, respectively.

In a fifth variant (example shown in FIG. 6A), the food identification module can be updated using weight imprinting, wherein the final layer weights can be set for a new category based on a scaled copy of the embedding layer activations for the training example (e.g., the images of the new food class, the image representation of the new food class, the features from the base of the generic sub-module or the prior food identification module, etc.).

In a specific example, S600 generates a personalized sub-module based on the user's cook history (e.g., trained on images associated with unidentified clusters within the user's cook history).

In a second specific example, S600 generates an updated generic sub-module based on a plurality of users' cook histories (e.g., trained on images associated with the same or similar unidentified clusters from multiple users' cook histories).

Figure 6B:
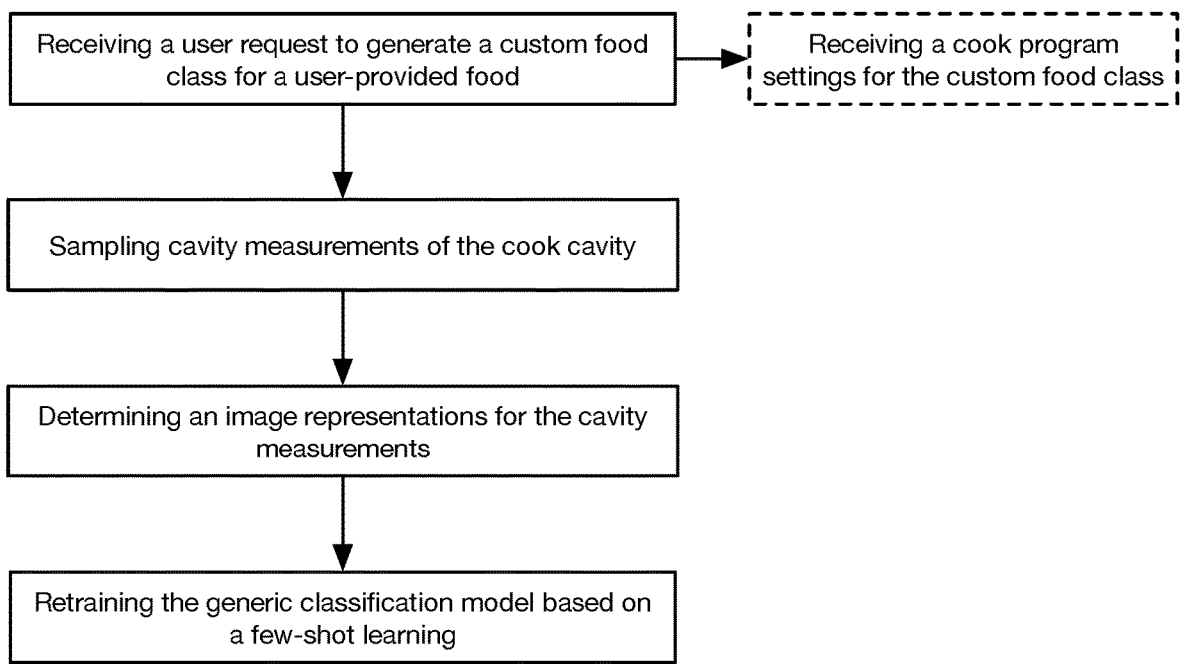

In a third specific example, S600 includes retraining the classifier head (e.g., using few-shot learning), using images associated with the new food class (e.g., shown in FIG. 6B)

However, the food identification module can be otherwise updated.

5.7 Determining a Cook Program Associated with the New Food Class S700.

Determining a cook program associated with the new food class S700 can function to enable the appliance to automatically cook the food without user input. The cook program can be determined in parallel with S600 and/or predetermined (e.g., based on user input associated with a prior image representation included in a new food class cluster (e.g., from S500). The cook program can be stored in association with the new food class (e.g., at the appliance, in the datastore, etc.) to enable cook program personalization and automatic cooking of food belonging to the new food class during subsequent appliance operation sessions.

In a first variant, the cook program can be generated by displaying the image to the user and prompting the user to manually provide cooking instructions for the appliance to cook the food (e.g., which can be stored as a cook program).

In a second variant, the cook program can be generated based on the historical cook programs associated with all image representations (or a subset thereof) or other identifier (e.g., hash value) of the new food class cluster (e.g., from S500). The historical cook programs can be from the same appliance or user, a plurality of appliances or users (e.g., that also provided the training data to determine the associated auxiliary sub-module, other appliances or users, etc.), and/or other sources. The historical cook programs can be averaged or otherwise combined.

In a third variant, a single cook program can be selected (e.g., randomly, most recent, etc.) from user provided cooking instructions stored in association with the image representations of the new food class cluster from S500.

In a fourth variant, a remote user (e.g., professional chef) can provide cooking instructions for a cook program which can be shared with other users (e.g., by updating auxiliary submodules of other users, by association with a generic food class).

The cook program can be associated (and stored) with the new food class in the datastore such that after the new food class is added to the food identification module in S600, the food associated with the new food class can be automatically recognized by the appliance and automatically cooked according to the cook program.

In a specific example, S700 enables a user to associate a personalized cook program with the newly-recognized food. The personalized cook program can be manually entered, determined from the historical cook programs associated with the previously-unidentified cluster, or otherwise determined.

In a second specific example, S700 determines a generic cook program for the user population. The generic cook program can be manually entered, determined from historical cook programs associated with the previously-unidentified cluster from multiple users, or otherwise determined.

However, the cook program can be otherwise determined.

Examples

In one variant, the method can include: using an imaging system arranged within a cooking cavity of a cooking system, sampling an image of foodstuff within the cooking cavity; encoding the image into an image representation; determining a food class based on the image representation, which includes: using a foodstuff identification module, comparing the image representation to a set of prior image representations, based on the comparison, determining a personalized cluster within the set of prior image representations, and determining the food class corresponding to the personalized cluster; determining cooking instructions for a cooking session associated with the foodstuff; based on the cooking instructions: cooking the foodstuff according to the cooking instructions; and creating a cook program associated with the food class; and updating the foodstuff identification module based on the image, image representation, and/or food class.

In one variant, the method can include: receiving a plurality of foodstuff images from a plurality of cooking systems; using a global foodstuff identification module: encoding the plurality of foodstuff images into a plurality of vectors; using a set of pretrained neural network classifiers, determining a set of foodstuff class scores associated with each vector of the plurality; for each of a set of identified vectors, selecting a foodstuff class having a foodstuff class score of maximum confidence; for each of a remainder of unidentified vectors, generating a vector index with a locality-sensitive hashing function; and storing each unidentified vectors in conjunction with the vector index; determining a cluster of unidentified vectors; creating a new food class for the cluster; generating a cook program for the new food class; and generating a trained neural network classifier for the new food class based on the cluster.

In one variant, a method of personalized cook program creation for a foodstuff, can include: using an imaging system arranged within a cooking cavity of a cooking system, sampling a plurality of images of the foodstuff within the cooking cavity; and encoding the plurality of images into a plurality of image representations; determining a personalized cluster using a foodstuff identification module based on a comparison of the plurality of image representations to a set of prior image representations; generating a personalized food class corresponding to the personalized cluster; creating a new cook program for the personalized food class; and updating the foodstuff identification module based on the personalized cluster.

In a variant, the method can include: receiving a custom cook program, sampling an image of food within the cook cavity, classifying the food based on the image, and associating the custom cook program with the food class, wherein the custom cook program is used in lieu of a default cook program for the food class when the food class is identified in future cook sessions. When the cook class is unknown (e.g., the probabilities of all candidate classes are below a predetermined threshold; a probability for the "unknown" class is highest or higher than a predetermined threshold; etc.), the custom cook program can be associated with the food representation (e.g., image feature vector, food feature vector, etc.), and used in future cook sessions when similar-appearing foods are detected in the cook cavity (e.g., determined based on the respective food representations).

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
   sampling an image of an unknown food within a cooking cavity of a cooking system;
   comparing the image to a set of prior images of other food;
   determining a cluster of prior images for the image based on the comparison;
   training a custom classification module to identify the unknown food, wherein the custom classification module is trained based on the prior images within the cluster; and
   associating a custom cook program with an output of the custom classification module.

2. The method of claim 1, wherein the prior images within the cluster comprise images of other food sharing a similar appearance with the food.

3. The method of claim 1, wherein the custom classification module is trained based on features extracted from the prior images within the cluster.

4. The method of claim 1, wherein the cooking system comprises at least one of a grill or an oven.

5. The method of claim 1, further comprising determining a food class for the unknown food based on the image using a pretrained machine learning model, wherein the custom classification module is trained when the pretrained machine learning model outputs an unknown food class based on the image.

6. The method of claim 5, wherein the custom classification module is concurrently executed with the pretrained machine learning model on a subsequent image of a subsequent unknown food.

7. The method of claim 6, wherein the food is cooked according to the custom cook program when a food class output by the custom classification module has a higher confidence score than a food class output by the pretrained machine learning model.

8. The method of claim 1, wherein comparing the image to a set of prior images comprises:
   extracting features from the image;
   extracting features from each of the set of prior images; and
   comparing the features from the image with the features from each of the set of prior images.

9. The method of claim 8, wherein the cluster of prior images is determined by clustering the prior images based on the respective features.

10. The method of claim 8, wherein the comparison comprises clustering the features from the image with features from the set of prior images.

11. The method of claim 10, wherein the features are extracted using a set of encoding layers of a model pretrained to identify a plurality of known foods.

12. The method of claim 10, wherein the features are extracted by a set of encoding layers trained end to end to identify a plurality of known foods.

13. A cooking system, comprising:
   a set of cooking elements thermally connected to a cook cavity; and
   a processing system configured to:
      receive an image of food within the cooking cavity;
      train a custom classification module to identify the food, comprising:
         determining embeddings for the image and each of a set of prior images;
         determining a cluster of prior images based on a comparison between the embedding for the image and the embeddings for each of the set of prior images; and
         training the custom classification module using the cluster of prior images; and
      associate a custom cook program with an output of the custom classification module.

14. The cooking system of claim 13, wherein the comparison comprises clustering the embedding for the image with the embeddings for each of the set of prior images.

15. The cooking system of claim 14, wherein the embeddings are clustered using at least one of locality-sensitive hashing or vector distances.

16. The cooking system of claim 13, wherein the output is assigned a user-defined label.

17. The cooking system of claim 13, wherein the cooking system comprises a grill.

18. The cooking system of claim 13, wherein the image is sampled by an image sensor of a user device.

19. The cooking system of claim 13, wherein the embeddings for the image and each of the set of prior images are determined by a set of encoding layers of a model pretrained to identify a plurality of known foods.

20. The cooking system of claim 19, wherein the model is concurrently executed with the custom classification module on a subsequent image of a subsequent food, wherein the set of cooking elements are controlled according to the custom cook program when an output of the custom classification module has a higher confidence score than an output of the model.

\* \* \* \* \*